US010733511B1

(12) United States Patent
Kim et al.

(10) Patent No.: US 10,733,511 B1
(45) Date of Patent: Aug. 4, 2020

(54) LEARNING METHOD AND LEARNING DEVICE FOR UPDATING HD MAP BY RECONSTRUCTING 3D SPACE BY USING DEPTH ESTIMATION INFORMATION AND CLASS INFORMATION ON EACH OBJECT, WHICH HAVE BEEN ACQUIRED THROUGH V2X INFORMATION INTEGRATION TECHNIQUE, AND TESTING METHOD AND TESTING DEVICE USING THE SAME

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/724,994

(22) Filed: Dec. 23, 2019

Related U.S. Application Data

(60) Provisional application No. 62/798,656, filed on Jan. 30, 2019.

(51) Int. Cl.
*G06K 9/00* (2006.01)
*G06N 3/08* (2006.01)
(Continued)

(52) U.S. Cl.
CPC ......... *G06N 3/084* (2013.01); *G01C 21/3691* (2013.01); *G06K 9/623* (2013.01);
(Continued)

(58) Field of Classification Search
CPC ...... G06N 3/084; G06N 3/0454; G06N 20/10; G06N 20/20; G06K 9/628; G06K 9/623; G06K 9/627; G01C 21/3691
See application file for complete search history.

(56) References Cited

U.S. PATENT DOCUMENTS 9,292,961 B1* 3/2016 Korchev ............... G06T 17/05
10,007,865 B1* 6/2018 Kim ..................... G06K 9/6231
(Continued)

FOREIGN PATENT DOCUMENTS

WO 2018222896 A1 12/2018

OTHER PUBLICATIONS

Huang, Xinyu, et al. "The apolloscape open dataset for autonomous driving and its application." arXiv preprint arXiv: 8103.06184 (2018).

*Primary Examiner* — Aaron W Carter
(74) *Attorney, Agent, or Firm* — Husch Blackwell LLP

(57) ABSTRACT

A learning method for selecting specific information, to be used for updating an HD Map is provided. And the method includes steps of: (a) a learning device instructing a coordinate neural network to generate a local feature map and a global feature vector by applying a coordinate neural network operation to a coordinate matrix; (b) the learning device instructing a determination neural network to generate a first estimated suitability score to an N-th estimated (Continued)

suitability score by applying a determination neural network operation to the integrated feature map; (c) the learning device instructing a loss layer to generate a loss by referring to (i) the first estimated suitability score to the N-th estimated suitability score and (ii) a first Ground Truth(GT) suitability score to an N-th GT suitability score, and perform backpropagation by using the loss, to thereby learn parameters of the determination neural network and the coordinate neural network.

30 Claims, 4 Drawing Sheets

(51) Int. Cl.
    *G06N 3/04*       (2006.01)
    *G06N 20/10*     (2019.01)
    *G01C 21/36*     (2006.01)
    *G06K 9/62*       (2006.01)
    *G06N 20/20*     (2019.01)

(52) U.S. Cl.
    CPC ............. *G06K 9/627* (2013.01); *G06K 9/628* (2013.01); *G06N 3/0454* (2013.01); *G06N 20/10* (2019.01); *G06N 20/20* (2019.01)

(56) References Cited

U.S. PATENT DOCUMENTS

| | | | |
|---|---|---|---|
| 10,073,461 B2* | 9/2018 | Song | G01S 17/89 |
| 10,162,358 B2* | 12/2018 | Song | G01C 21/005 |
| 10,282,864 B1* | 5/2019 | Kim | G06T 7/11 |
| 10,360,686 B2* | 7/2019 | Wang | G06T 7/579 |
| 10,380,890 B2* | 8/2019 | Wang | G01S 19/45 |
| 10,395,140 B1* | 8/2019 | Kim | G06N 3/084 |
| 10,445,928 B2* | 10/2019 | Nehmadi | G01S 7/295 |
| 10,447,945 B2* | 10/2019 | Oetting | G06F 3/013 |
| 10,481,267 B2* | 11/2019 | Wang | G01S 17/89 |
| 10,488,521 B2* | 11/2019 | Wang | G01S 17/931 |
| 10,520,593 B2* | 12/2019 | Pacala | G01S 7/51 |
| 10,528,867 B1* | 1/2020 | Kim | G06N 3/084 |
| 2014/0222370 A1* | 8/2014 | Manzke | G01B 11/16 |
| | | | 702/150 |
| 2014/0233010 A1* | 8/2014 | Baldwin | G01C 21/30 |
| | | | 356/4.01 |
| 2016/0366348 A1* | 12/2016 | Dixon | H04N 5/2354 |
| 2017/0249401 A1* | 8/2017 | Eckart | G06F 17/18 |
| 2018/0299557 A1* | 10/2018 | Yi | G01S 17/86 |
| 2018/0306922 A1* | 10/2018 | Wan | G01S 17/89 |
| 2018/0330504 A1* | 11/2018 | Karlinsky | G06F 16/5838 |
| 2019/0271780 A1* | 9/2019 | Bravo Orellana | G01S 17/42 |
| 2019/0355173 A1* | 11/2019 | Gao | G06T 7/50 |

* cited by examiner

LEARNING METHOD AND LEARNING DEVICE FOR UPDATING HD MAP BY RECONSTRUCTING 3D SPACE BY USING DEPTH ESTIMATION INFORMATION AND CLASS INFORMATION ON EACH OBJECT, WHICH HAVE BEEN ACQUIRED THROUGH V2X INFORMATION INTEGRATION TECHNIQUE, AND TESTING METHOD AND TESTING DEVICE USING THE SAME

CROSS REFERENCE OF RELATED APPLICATION

This present application claims the benefit of the earlier filing date of provisional patent application No. 62/798,656, filed Jan. 30, 2019, the entire contents of which being incorporated herein by reference.

FIELD OF THE DISCLOSURE

The present disclosure relates to a learning method and a learning device for use with an autonomous vehicle; and more particularly, to the learning method and the learning device for updating an HD map and performing 3D space reconstruction, and a testing method and a testing device using the same.

BACKGROUND OF THE DISCLOSURE

Recently, autonomous driving technology of vehicles has attracted attention. The autonomous driving technology refers to a technology that allows a vehicle to travel safely by collecting and using external information through modules capable of acquiring external information, such as a sensor and a camera mounted on the vehicle.

An HD Map is an essential requirement for the autonomous driving technology, because the HD Map is a high-density, centimeter-accurate map that is necessary for safe driving of autonomous vehicles.

However, creating such an HD Map is very difficult, time consuming and expensive. This is because, in order to collect information to be included in the HD Map, a vehicle equipped with adequate devices must travel to every place reachable, and the extracted information must be checked to see if temporary information, such as a vehicle parked on the roadside, is included. Due to this high cost, not many HD maps are produced.

SUMMARY OF THE DISCLOSURE

It is an object of the present disclosure to solve all the aforementioned problems.

It is an object of the present disclosure to provide a learning method for (i) updating at least one HD map by acquiring multi-vehicle depth estimation information using a V2X information fusion and (ii) performing a 3D space reconstruction by using the multi-vehicle depth estimation information, to thereby support a vehicle to perform autonomous driving safely.

It is another object of the present disclosure to provide a method for classifying map data acquired from data acquisition vehicles and evaluating the map data to update the HD Map.

It is still another object of the present disclosure to provide a method for evaluating the map data by referring to both local information and global information of the map data.

In accordance with one aspect of the present disclosure, there is provided a learning method for selecting specific information, to be used for updating an HD Map, among information acquired through multiple vehicles, including steps of: (a) a learning device, if at least one coordinate matrix, including information on a first coordinate to an N-th coordinate, corresponding to a first cloud point to an N-th cloud point detected in a target region, is acquired, instructing a coordinate neural network to generate at least one local feature map and at least one global feature vector by applying at least one coordinate neural network operation to the coordinate matrix; (b) the learning device, if at least one integrated feature map, which has been generated by integrating (i) the local feature map, (ii) the global feature vector and (iii) at least one class matrix including information on first class information to N-th class information corresponding to the first cloud point to the N-th cloud point, is acquired, instructing a determination neural network to generate a first estimated suitability score to an N-th estimated suitability score, each of which represents a probability of information on its corresponding cloud point being used for updating the HD Map, by applying at least one determination neural network operation to the integrated feature map; (c) the learning device instructing a loss layer to generate a loss by referring to (i) the first estimated suitability score to the N-th estimated suitability score and (ii) a first Ground Truth(GT) suitability score to an N-th GT suitability score, and perform backpropagation by using the loss, to thereby learn at least part of parameters of the determination neural network and the coordinate neural network.

As one example, at the step of (a), the learning device instructs each of one or more coordinate convolutional neurons in at least one coordinate convolutional layer of the coordinate neural network to apply at least one coordinate convolutional neuron operation to its inputted value by using its own parameter, and to deliver its outputted value to its next coordinate convolutional neuron, to thereby apply at least one coordinate convolutional operation, which is at least part of the coordinate neural network operation, to the coordinate matrix, and then to thereby generate the local feature map.

As one example, at the step of (a), the learning device instructs a global feature layer in the coordinate neural network to apply at least one global feature operation, which is at least part of the coordinate neural network operation, to the local feature map, to thereby generate the global feature vector.

As one example, at the step of (b), the integrated feature map is generated by channel-wise concatenating (i) the class matrix including the first class information to the N-th class information as its components, arranged in a specific order, (ii) the local feature map including each of feature values corresponding to each of the first cloud point to the N-th cloud point, as its components, arranged in the specific order, and (iii) a global feature map generated by duplicating the global feature vector N times.

As one example, at the step of (b), the learning device (i) instructs each of one or more determination convolutional neurons in at least one determination convolutional layer of the determination neural network to apply at least one determination convolutional neuron operation to its inputted value by using its own parameter, and to deliver its outputted value to its next determination convolutional neuron, to thereby apply at least one determination convolutional operation, which is at least part of the determination neural network operation, to the determination matrix, and then to thereby generate a determination feature map, and (ii) instructs a determination output layer in the determination neural network to perform a classification operation, which is at least part of the determination neural network operation, on the first cloud point to the N-th cloud point by referring to the determination feature map, to thereby generate the first estimated suitability score to the N-th estimated suitability score.

As one example, at the step of (c), the learning device instructs the loss layer to generate the loss by using a following formula:

$$Loss = -\frac{1}{N}\sum_{i=1}^{N} y_i \log(\hat{y}_i)$$

wherein N denotes the number of the first cloud point to the N-th cloud point, $y_i$ denotes an i-th estimated suitability score, and $\hat{y}_i$ denotes an i-th GT suitability score.

As one example, at the step of (c), the learning device instructs the loss layer to perform the backpropagation by using a gradient-descent scheme, to thereby allow a subsequent first estimated suitability score to a subsequent N-th estimated suitability score, to be generated by using the parameters adjusted by the backpropagation, to become relatively more similar to a subsequent first GT suitability score to a subsequent N-th GT suitability score corresponding thereto.

As one example, a server, which interworks with one or more data acquisition vehicles, (i) classifies each of pieces of map data, acquired through each of the data acquisition vehicles, by using each of pieces of location information on each of locations where each of pieces of the map data has been acquired, (ii) generates the coordinate matrix and the class matrix by using target information on the target region in the classified map data and (iii) delivers the coordinate matrix and the class matrix to the learning device.

As one example, the server, if a first specific piece of the map data and a second specific piece of the map data both correspond to a same specific region, integrates the first and the second specific pieces by applying at least one integration operation to the first and the second specific pieces.

As one example, each of the data acquisition vehicles uses (i) at least part of at least one camera and at least one depth sensor and (ii) an operation module, corresponding to said at least part of the camera and the depth sensor, to acquire cloud point information and class information on one or more objects located closer than a threshold from itself, to thereby acquire at least part of the map data and deliver said at least part of the map data to the server.

As one example, the server performs (i) a process of generating the coordinate matrix by using specific cloud point information, corresponding to the target region, in the map data and (ii) a process of generating the class matrix by using specific class information, corresponding to the target region, in the map data.

In accordance with another aspect of the present disclosure, there is provided a testing method for selecting specific information, to be used for updating an HD Map, among information acquired through multiple vehicles, including steps of: (a) on condition that (1) a learning device, if at least one coordinate matrix for training, including information on a first coordinate for training to an N-th coordinate for training, corresponding to a first cloud point for training to an N-th cloud point for training detected in a target region for training, is acquired, has instructed a coordinate neural network to generate at least one local feature map for training and at least one global feature vector for training by applying at least one coordinate neural network operation to the coordinate matrix for training; (2) the learning device, if at least one integrated feature map for training, which has been generated by integrating (i) the local feature map for training, (ii) the global feature vector for training and (iii) at least one class matrix for training including information on first class information for training to N-th class information for training corresponding to the first cloud point for training to the N-th cloud point for training, is acquired, has instructed a determination neural network to generate a first estimated suitability score for training to an N-th estimated suitability score for training, each of which represents a probability of information on its corresponding cloud point for training being used for updating an HD Map for training, by applying at least one determination neural network operation to the integrated feature map for training; (3) the learning device has instructed a loss layer to generate a loss by referring to (i) the first estimated suitability score for training to the N-th estimated suitability score for training and (ii) a first Ground Truth(GT) suitability score to an N-th GT suitability score, and perform backpropagation by using the loss, to thereby learn at least part of parameters of the determination neural network and the coordinate neural network, a testing device, if at least one coordinate matrix for testing, including information on a first coordinate for testing to an N-th coordinate for testing, corresponding to a first cloud point for testing to an N-th cloud point for testing detected in a target region for testing, is acquired, instructing the coordinate neural network to generate at least one local feature map for testing and at least one global feature vector for testing by applying the coordinate neural network operation to the coordinate matrix for testing; (b) the testing device, if at least one integrated feature map for testing, which has been generated by integrating (i) the local feature map for testing, (ii) the global feature vector for testing and (iii) at least one class matrix for testing including information on first class information for testing to N-th class information for testing corresponding to the first cloud point for testing to the N-th cloud point for testing, is acquired, instructing the determination neural network to generate a first estimated suitability score for testing to an N-th estimated suitability score for testing, each of which represents a probability of information on its corresponding cloud point for testing being used for updating an HD Map for testing, by applying the determination neural network operation to the integrated feature map for testing.

As one example, the method further includes a step of: (d) the testing device instructing an updating module to determine whether each of the first estimated suitability score for testing to the N-th estimated suitability score for testing is larger than a threshold or not, and update the HD Map for testing by using specific information on one or more specific cloud points whose corresponding specific estimated suitability scores are larger than the threshold.

As one example, a server for testing, which interworks with one or more data acquisition vehicles for testing, (i) classifies each of pieces of map data for testing, acquired through each of the data acquisition vehicles for testing, by using each of pieces of location information for testing on each of locations where each of pieces of the map data for testing has been acquired, (ii) generates the coordinate matrix for testing and the class matrix for testing by using target information for testing on the target region for testing in the classified map data for testing, and (iii) delivers the coordinate matrix for testing and the class matrix for testing to the testing device.

As one example, the server for testing performs (i) a process of generating the coordinate matrix for testing by using specific cloud point information for testing, corresponding to the target region for testing, in the map data for testing and (ii) a process of generating the class matrix for testing by using specific class information for testing, corresponding to the target region for testing, in the map data for testing.

In accordance with still another aspect of the present disclosure, there is provided a learning device for selecting specific information, to be used for updating an HD Map, among information acquired through multiple vehicles, including: at least one memory that stores instructions; and at least one processor configured to execute the instructions to perform processes of: (I) if at least one coordinate matrix, including information on a first coordinate to an N-th coordinate, corresponding to a first cloud point to an N-th cloud point detected in a target region, is acquired, instructing a coordinate neural network to generate at least one local feature map and at least one global feature vector by applying at least one coordinate neural network operation to the coordinate matrix; (II) if at least one integrated feature map, which has been generated by integrating (i) the local feature map, (ii) the global feature vector and (iii) at least one class matrix including information on first class information to N-th class information corresponding to the first cloud point to the N-th cloud point, is acquired, instructing a determination neural network to generate a first estimated suitability score to an N-th estimated suitability score, each of which represents a probability of information on its corresponding cloud point being used for updating the HD Map, by applying at least one determination neural network operation to the integrated feature map; (III) instructing a loss layer to generate a loss by referring to (i) the first estimated suitability score to the N-th estimated suitability score and (ii) a first Ground Truth(GT) suitability score to an N-th GT suitability score, and perform backpropagation by using the loss, to thereby learn at least part of parameters of the determination neural network and the coordinate neural network.

As one example, at the process of (I), the processor instructs each of one or more coordinate convolutional neurons in at least one coordinate convolutional layer of the coordinate neural network to apply at least one coordinate convolutional neuron operation to its inputted value by using its own parameter, and to deliver its outputted value to its next coordinate convolutional neuron, to thereby apply at least one coordinate convolutional operation, which is at least part of the coordinate neural network operation, to the coordinate matrix, and then to thereby generate the local feature map.

As one example, at the process of (I), the processor instructs a global feature layer in the coordinate neural network to apply at least one global feature operation, which is at least part of the coordinate neural network operation, to the local feature map, to thereby generate the global feature vector.

As one example, at the process of (II), the integrated feature map is generated by channel-wise concatenating (i) the class matrix including the first class information to the N-th class information as its components, arranged in a specific order, (ii) the local feature map including each of feature values corresponding to each of the first cloud point to the N-th cloud point, as its components, arranged in the specific order, and (iii) a global feature map generated by duplicating the global feature vector N times.

As one example, at the process of (II), the processor (i) instructs each of one or more determination convolutional neurons in at least one determination convolutional layer of the determination neural network to apply at least one determination convolutional neuron operation to its inputted value by using its own parameter, and to deliver its outputted value to its next determination convolutional neuron, to thereby apply at least one determination convolutional operation, which is at least part of the determination neural network operation, to the determination matrix, and then to thereby generate a determination feature map, and (ii) instructs a determination output layer in the determination neural network to perform a classification operation, which is at least part of the determination neural network operation, on the first cloud point to the N-th cloud point by referring to the determination feature map, to thereby generate the first estimated suitability score to the N-th estimated suitability score.

As one example, at the process of (III), the processor instructs the loss layer to generate the loss by using a following formula:

$$\text{Loss} = -\frac{1}{N}\sum_{i=1}^{N} y_i \log(\hat{y}_i)$$

wherein N denotes the number of the first cloud point to the N-th cloud point, $y_i$ denotes an i-th estimated suitability score, and $\hat{y}_i$ denotes an i-th GT suitability score.

As one example, at the process of (III), the processor instructs the loss layer to perform the backpropagation by using a gradient-descent scheme, to thereby allow a subsequent first estimated suitability score to a subsequent N-th estimated suitability score, to be generated by using the parameters adjusted by the backpropagation, to become relatively more similar to a subsequent first GT suitability score to a subsequent N-th GT suitability score corresponding thereto.

As one example, a server, which interworks with one or more data acquisition vehicles, (i) classifies each of pieces of map data, acquired through each of the data acquisition vehicles, by using each of pieces of location information on each of locations where each of pieces of the map data has been acquired, (ii) generates the coordinate matrix and the class matrix by using target information on the target region in the classified map data and (iii) delivers the coordinate matrix and the class matrix to the learning device.

As one example, the server, if a first specific piece of the map data and a second specific piece of the map data both correspond to a same specific region, integrates the first and the second specific pieces by applying at least one integration operation to the first and the second specific pieces.

As one example, each of the data acquisition vehicles uses (i) at least part of at least one camera and at least one depth sensor and (ii) an operation module, corresponding to said at least part of the camera and the depth sensor, to acquire cloud point information and class information on one or more objects located closer than a threshold from itself, to thereby acquire at least part of the map data and deliver said at least part of the map data to the server.

As one example, the server performs (i) a process of generating the coordinate matrix by using specific cloud point information, corresponding to the target region, in the map data and (ii) a process of generating the class matrix by using specific class information, corresponding to the target region, in the map data.

In accordance with still yet another aspect of the present disclosure, there is provided a testing device for selecting specific information, to be used for updating an HD Map, among information acquired through multiple vehicles, including: at least one memory that stores instructions; and at least one processor configured to execute the instructions to perform processes of: (I) on condition that (1) a learning device, if at least one coordinate matrix for training, including information on a first coordinate for training to an N-th coordinate for training, corresponding to a first cloud point for training to an N-th cloud point for training detected in a target region for training, is acquired, has instructed a coordinate neural network to generate at least one local feature map for training and at least one global feature vector for training by applying at least one coordinate neural network operation to the coordinate matrix for training; (2) the learning device, if at least one integrated feature map for training, which has been generated by integrating (i) the local feature map for training, (ii) the global feature vector for training and (iii) at least one class matrix for training including information on first class information for training to N-th class information for training corresponding to the first cloud point for training to the N-th cloud point for training, is acquired, has instructed a determination neural network to generate a first estimated suitability score for training to an N-th estimated suitability score for training, each of which represents a probability of information on its corresponding cloud point for training being used for updating an HD Map for training, by applying at least one determination neural network operation to the integrated feature map for training; (3) the learning device has instructed a loss layer to generate a loss by referring to (i) the first estimated suitability score for training to the N-th estimated suitability score for training and (ii) a first Ground Truth(GT) suitability score to an N-th GT suitability score, and perform backpropagation by using the loss, to thereby learn at least part of parameters of the determination neural network and the coordinate neural network, if at least one coordinate matrix for testing, including information on a first coordinate for testing to an N-th coordinate for testing, corresponding to a first cloud point for testing to an N-th cloud point for testing detected in a target region for testing, is acquired, instructing the coordinate neural network to generate at least one local feature map for testing and at least one global feature vector for testing by applying the coordinate neural network operation to the coordinate matrix for testing; (II) if at least one integrated feature map for testing, which has been generated by integrating (i) the local feature map for testing, (ii) the global feature vector for testing and (iii) at least one class matrix for testing including information on first class information for testing to N-th class information for testing corresponding to the first cloud point for testing to the N-th cloud point for testing, is acquired, instructing the determination neural network to generate a first estimated suitability score for testing to an N-th estimated suitability score for testing, each of which represents a probability of information on its corresponding cloud point for testing being used for updating an HD Map for testing, by applying the one determination neural network operation to the integrated feature map for testing.

As one example, the processor further performs a process of: (IV) instructing an updating module to determine whether each of the first estimated suitability score for testing to the N-th estimated suitability score for testing is larger than a threshold or not, and update the HD Map for testing by using specific information on one or more specific cloud points whose corresponding specific estimated suitability scores are larger than the threshold.

As one example, a server for testing, which interworks with one or more data acquisition vehicles for testing, (i) classifies each of pieces of map data for testing, acquired through each of the data acquisition vehicles for testing, by using each of pieces of location information for testing on each of locations where each of pieces of the map data for testing has been acquired, (ii) generates the coordinate matrix for testing and the class matrix for testing by using target information for testing on the target region for testing in the classified map data for testing and (iii) delivers the coordinate matrix for testing and the class matrix for testing to the testing device.

As one example, the server for testing performs (i) a process of generating the coordinate matrix for testing by using specific cloud point information for testing, corresponding to the target region for testing, in the map data for testing and (ii) a process of generating the class matrix for testing by using specific class information for testing, corresponding to the target region for testing, in the map data for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
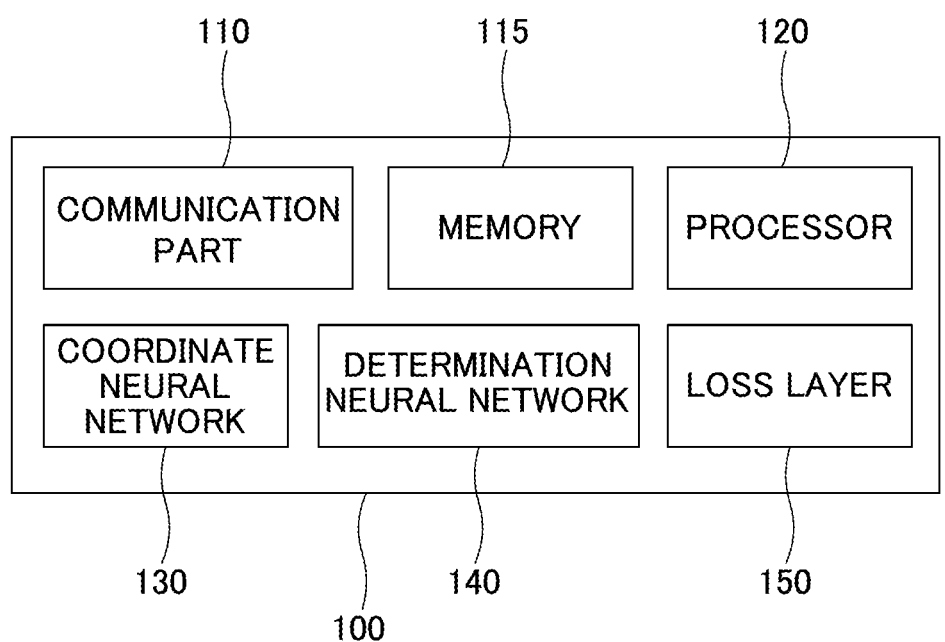
FIG. 1 is a drawing schematically illustrating a configuration of a learning device performing a learning method for selecting specific information, to be used for updating an HD Map, among information acquired through multiple vehicles, in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of a learning device performing a learning method for selecting specific information, to be used for updating an HD Map, among information acquired through multiple vehicles, in accordance with one example embodiment of the present disclosure.

By referring to FIG. 1, the learning device 100 may include at least one coordinate neural network 130, at least one determination neural network 140 and at least one loss layer 150, to be described later. Processes of input/output and computations of the coordinate neural network 130, the determination neural network 140 and the loss layer 150 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

So far the configuration of the learning device 100 has been explained. Below, the learning method of the present disclosure will be explained briefly.

Figure 2:
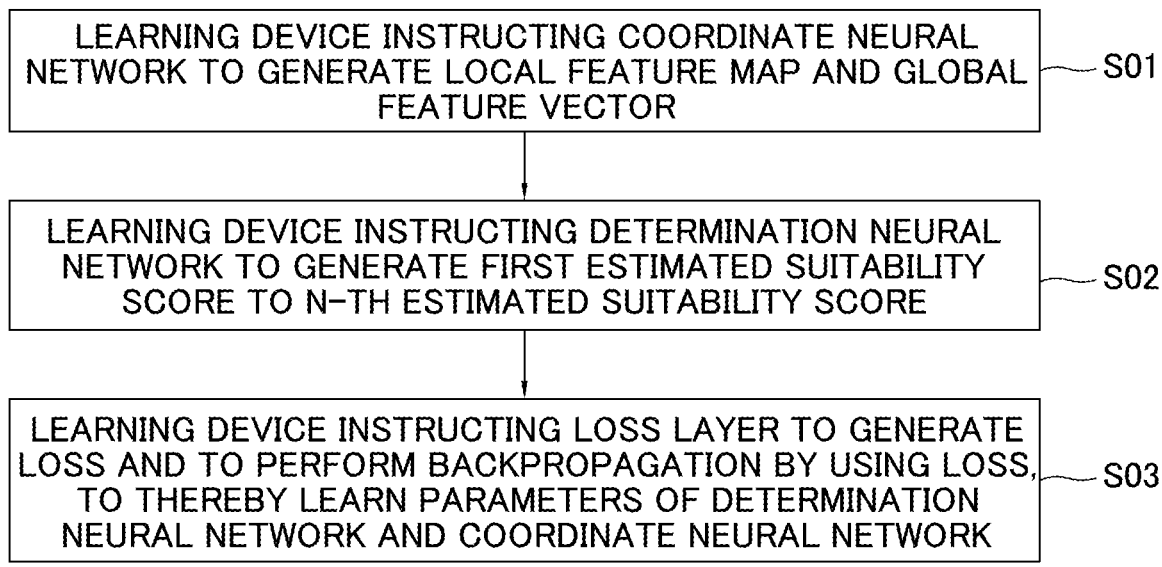
FIG. 2 is a drawing schematically illustrating a flow of the learning method for selecting the specific information, to be used for updating the HD Map, among the information acquired through the multiple vehicles, in accordance with one example embodiment of the present disclosure.

FIG. 2 is a drawing schematically illustrating a flow of the learning method for selecting the specific information, to be used for updating the HD Map, among the information acquired through the multiple vehicles, in accordance with one example embodiment of the present disclosure.

By referring to FIG. 2, at a step of S01, the learning device 100 may instruct the coordinate neural network 130 to generate at least one local feature map and at least one global feature vector by applying at least one coordinate neural network operation to a coordinate matrix, to be explained later. Thereafter, at a step of S02, the learning device 100 may instruct the determination neural network 140 to generate a first estimated suitability score to an N-th estimated suitability score by applying at least one determination neural network operation to at least one integrated feature map to be explained later. Finally, at a step of S03, the learning device 100 may instruct the loss layer 150 to generate a loss by referring to (i) the first estimated suitability score to the N-th estimated suitability score and (ii) a first Ground Truth(GT) suitability score to an N-th GT suitability score, and to perform backpropagation by using the loss, to thereby learn at least part of parameters of the determination neural network 140 and the coordinate neural network 130.

Above the learning method of the present disclosure has been explained briefly. Below, it will be explained more specifically, by referring to FIG. 3.

Figure 3:
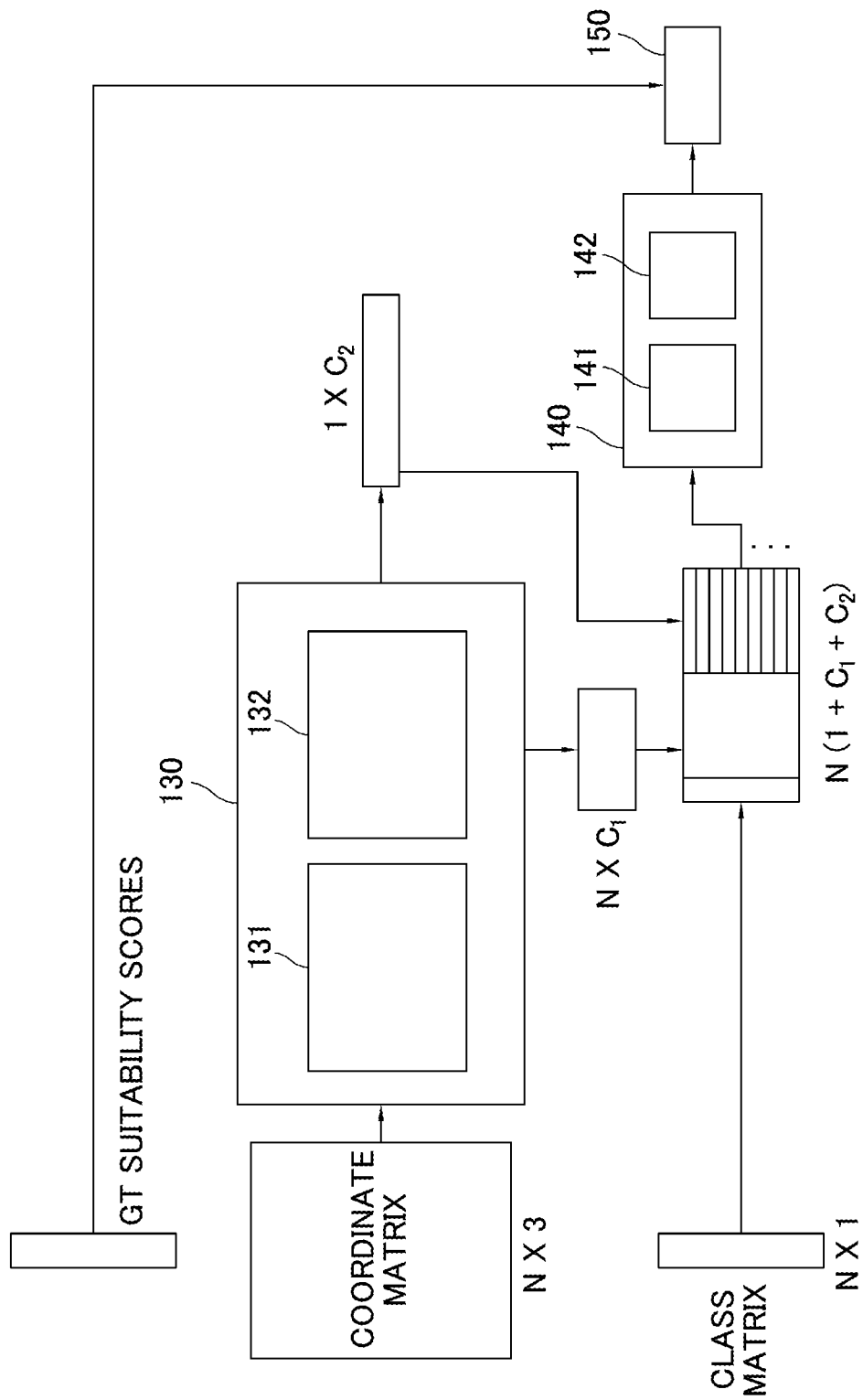
FIG. 3 is a drawing schematically illustrating how a coordinate neural network and a determination neural network are trained, wherein the coordinate neural network and the determination neural network are used for performing the learning method for selecting the specific information, to be used for updating the HD Map, among the information acquired through the multiple vehicles, in accordance with one example embodiment of the present disclosure.

FIG. 3 is a drawing schematically illustrating how a coordinate neural network and a determination neural network are trained, wherein the coordinate neural network and the determination neural network are used for performing the learning method for selecting the specific information, to be used for updating the HD Map, among the information acquired through the multiple vehicles, in accordance with one example embodiment of the present disclosure.

By referring to FIG. 3, it can be seen that the coordinate matrix with a size of N×3 is inputted. Herein, the coordinate matrix may include information on a first coordinate to an N-th coordinate, corresponding to a first cloud point to an N-th cloud point detected in a target region to be updated in the HD Map. The size may be N×3 since there are N cloud points and a dimension of a real world is 3. Also, each of pieces of information on the first coordinate to the N-th coordinate may be arranged in a specific order that each of the pieces of the information is located in each of a first row to an N-th row therein. How the information on the first coordinate to the N-th coordinate can be acquired will be explained after the learning method of the present disclosure is explained.

After such coordinate matrix is inputted, the learning device 100 may instruct the coordinate neural network 130 to generate the local feature map and the global feature vector by applying said at least one coordinate neural network operation to the coordinate matrix.

Specifically, the learning device 100 may instruct each of one or more coordinate convolutional neurons in at least one coordinate convolutional layer 131 of the coordinate neural network to apply at least one coordinate convolutional neuron operation to its inputted value by using its own parameter, and to deliver its outputted value to its next coordinate convolutional neuron, to thereby apply the coordinate convolutional operation to the coordinate matrix, and then to thereby generate the local feature map. Herein, the coordinate convolutional operation may be included in the coordinate neural network operation. Such process shown above is similar to a well-known scheme, which is named as "Feedforward", to be used for generating a feature map in a field of the Deep Learning, thus those skilled in the art may be able to understand the process by referring to the above explanation. As an example embodiment, the local feature map may be 2-dimensional, with a size of $N \times C_1$, $C_1$ being larger than 3.

After the local feature map is generated, the learning device 100 may instruct a global feature layer 132 to apply at least one global feature operation to the local feature map, to thereby generate the global feature vector. The global feature operation may be part of the coordinate neural network operation. As an example embodiment, the global feature layer 132 may be similar to pooling layers of prior arts, and the global feature operation may be similar to pooling operations of the prior arts. As another example embodiment, the global feature layer 132 may be similar to Fully-Connected(FC) layers of the prior arts, and the global feature operation may be similar to FC operations of the prior arts. That is, any schemes of the prior arts capable of generating the global feature vector including global information on the target region may be used. Further, as an example embodiment, the global feature vector may be 1-dimensional with a size $1 \times C_2$.

As can be seen in a difference between sizes of the local feature map and the global feature vector, the two may include different information. That is, the local feature map may be "local" because each pieces of local information on each of the first cloud point to the N-th cloud point may be located in each of rows therein. On the other hand, the global feature vector with the size of $1 \times C_2$, may include global information on all of the cloud points, not on each of the cloud points.

Thereafter, the learning device 100 may instruct an integration module(not illustrated) to generate an integrated feature map by using a class matrix, along with the local feature map and the global feature vector. Herein, the class matrix may include first class information to N-th class information corresponding to the first cloud point to the N-th cloud point. As an example, in the class matrix, the first class information to the N-th class information may be arranged in the specific order that each of the first class information to the N-th class information is located in each of a first row to an N-th row therein.

On such condition, the integration module, as an example shown in FIG. 3, may channel-wise concatenate the class matrix, the local feature map and a global feature map generated by duplicating the global feature vector N times. Herein, the class matrix, the local feature map and the global feature map may be channel-wise concatenated in any order, e.g., in the order of the class matrix, the local feature map, and the global feature map as shown in FIG. 3, or in the order of the local feature map, the class matrix, and the global feature map.

Thereafter, the learning device 100 may instruct the determination neural network 140 to apply the determination neural network operation to the integrated feature map, to thereby generate the first estimated suitability score to the N-th estimated suitability score, each of which represents a probability of information on its corresponding cloud point being used for updating the HD Map. Hereafter, the reason why the first estimated suitability score to the N-th estimated suitability score are used will be explained.

To be explained later, the information on the first cloud point to the N-th cloud point, to be used for updating the HD Map, may have been acquired by each of one or more data acquisition vehicles, driving in its assigned regions including the target region. In this case, the information on the cloud points may include undesirable information on temporary objects such as a passing car, a temporarily stopped car or a passenger. The estimated suitability scores may be used for determining whether information on its corresponding cloud point is said undesirable information or not.

Hereinafter, the process of generating the estimated suitability scores will be explained more specifically. That is, the learning device 100 may (i) instruct each of one or more determination convolutional neurons in at least one determination convolutional layer 141 of the determination neural network 140 to apply at least one determination convolutional neuron operation to its inputted value by using its own parameter, and to deliver its outputted value to its next determination convolutional neuron, to thereby apply at least one determination convolutional operation, which is at least part of the determination neural network operation, to the determination matrix, and then to thereby generate a determination feature map. And, the learning device 100 may (ii) instruct a determination output layer 142 in the determination neural network 140 to perform a classification operation, which is at least part of the determination neural network operation, on the first cloud point to the N-th cloud point by referring to the determination feature map, to thereby generate the first estimated suitability score to the N-th estimated suitability score.

Such usage of the determination convolutional layer 141 and the determination output layer 142 is similar to a scheme named "Multi-Layer Perceptron(MLP)", which is one kind of said scheme "Feedforward", thus a person in the art may be able to understand the process of generating the estimated suitability scores. As another example embodiment, a scheme of the prior arts to be used for processing sparse data in the field of Deep Learning may be applied to the determination neural network 140. That is, the determination neural network 140 may be configured to include FC layers as its components, along with transformation networks, which can be configured by using the well-known prior arts, connected parallel to them. More specific explanation can be omitted.

Thereafter, the learning device 100 may instruct the loss layer 150 to generate the loss by referring to (i) the first estimated suitability score to the N-th estimated suitability score and (ii) the first GT suitability score to the N-th GT suitability score, and perform backpropagation by using the loss, to thereby learn at least part of parameters of the determination neural network 140 and the coordinate neural network 130. Each of the first GT suitability score to the N-th GT suitability score may correspond to each of the first estimated suitability score to the N-th estimated suitability score, and may have been inputted to the learning device 100 by a manager to train the learning device 100.

Herein, the loss can be generated by using a following formula:

$$Loss = -\frac{1}{N}\sum_{i=1}^{N} y_i \log(\hat{y}_i)$$

Herein N may denote the number of the first cloud point to the N-th cloud point, $y_i$ may denote an i-th estimated suitability score, and $\hat{y}_i$ may denote an i-th GT suitability score. The formula may seem similar to that of a well-known scheme named "Cross-Entropy", but any schemes for generating the loss may be used for the present disclosure.

Thereafter, the learning device 100 may instruct the loss layer 150 to perform backpropagation by using a gradient-descent scheme, to thereby learn the parameters. After performing training processes as shown above, a subsequent first estimated suitability score to a subsequent N-th estimated suitability score, to be generated by using the parameters adjusted by the backpropagation, may become relatively more similar to a subsequent first GT suitability score to a subsequent N-th GT suitability score corresponding thereto.

The learning method of the present disclosure has been explained as shown above. Below, how the coordinate matrix, the class matrix and the GT suitability scores can be acquired will be explained.

First, there may be provided said one or more data acquisition vehicles, to be used for updating the HD Map. The data acquisition vehicles may include (i) at least part of at least one camera for video and at least one depth sensor, e.g., 3D ToF camera, and (ii) an operation module, e.g., a computing device, corresponding to said at least part of the camera and the depth sensor, and may interwork with a server.

Herein, each of the data acquisition vehicles may drive in its assigned regions to acquire at least part of map data, by processing information acquired from its camera, its depth sensor, or both, through the operation module. As an example, the map data may include cloud point information and object class information.

Specifically, a specific data acquisition vehicle may apply an object detection operation, which is a well-known prior art, to information acquired through its camera, to thereby acquire specific object class information, and may integrate (i) specific relative coordinate information of specific objects around the specific data acquisition vehicle and (ii) specific location information on a location where the specific data acquisition vehicle has been located at a timing when the specific relative coordinate information has been acquired, through its operation module, to generate specific cloud point information. Thereafter, the specific data acquisition vehicle may deliver specific map data including the specific object class information and the specific cloud point information to the server.

The server may map the object class information onto a virtual space generated by referring to the cloud point information to acquire information on each of classes corresponding to each of the cloud points, and may classify each of pieces of the map data by referring to each of pieces of location information on each of locations where each of pieces of the map data has been acquired. And, classified map data may be used for generating the coordinate matrix and the class matrix. That is, the map data acquired from the data acquisition vehicles may be divided region by region, evaluated region by region, and used for updating the HD Map. Herein, how the server deals with a case that two pieces of the map data correspond to a same specific region will be explained.

That is, if a first specific piece of the map data and a second specific piece of the map data both correspond to the same specific region, the server may integrate the first and the second specific pieces by applying at least one integration operation to the first and the second specific pieces. Herein, the integration operation may have been built by using a well-known prior art named "ICP Algorithm."

Thereafter, the server may perform (i) a process of generating the coordinate matrix by using specific cloud point information, corresponding to the target region, in the map data and (ii) a process of generating the class matrix by using specific class information, corresponding to the target region, in the map data. Such coordinate matrix and such class matrix may be inputted to the coordinate neural network 130 and the determination neural network 140, in order to train them.

Also, information on the first cloud point to the N-th cloud point, included in the coordinate matrix and the class matrix, may be processed by a labeler, to thereby generate the first GT suitability score to the N-th GT suitability score. The labeler may be a human or a computer program.

So far the learning method of the present disclosure, and how the coordinate matrix, the class matrix and the first GT suitability score to the N-th suitability score are acquired have been explained. Below, a testing method of the present disclosure will be explained, by referring to FIG. 4.

Figure 4:
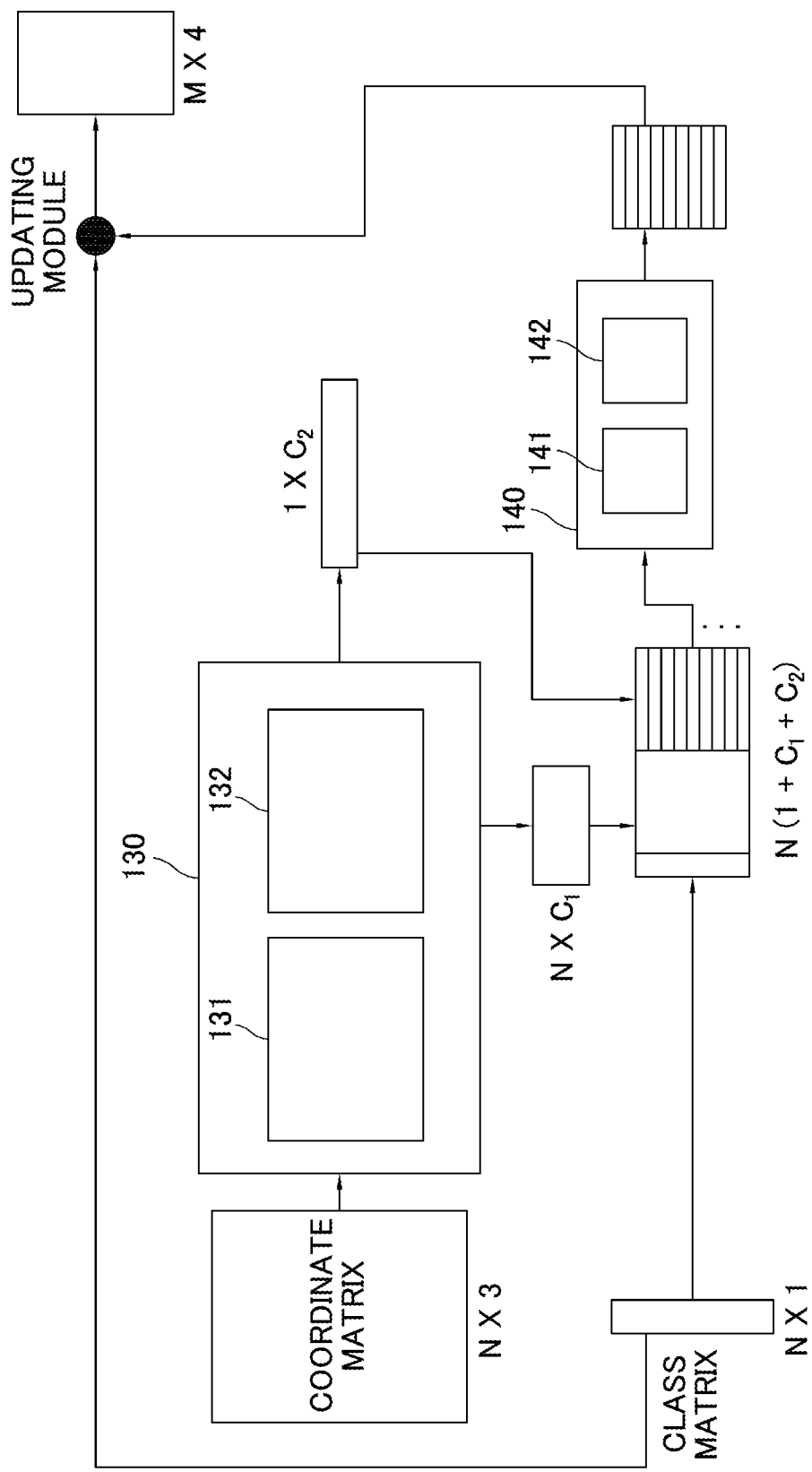
FIG. 4 is a drawing schematically illustrating how a coordinate neural network and a determination neural network are tested, wherein the coordinate neural network and the determination neural network are used for performing the testing method for selecting the specific information, to be used for updating the HD Map, among the information acquired through the multiple vehicles, in accordance with one example embodiment of the present disclosure.

By referring to FIG. 4, on condition that (1) the learning device 100, if at least one coordinate matrix for training, including information on a first coordinate for training to an N-th coordinate for training, corresponding to a first cloud point for training to an N-th cloud point for training detected in a target region for training, is acquired, has instructed the coordinate neural network 130 to generate at least one local feature map for training and at least one global feature vector for training by applying the coordinate neural network operation to the coordinate matrix for training; (2) the learning device 100, if at least one integrated feature map for training, which has been generated by integrating (i) the local feature map for training, (ii) the global feature vector for training and (iii) at least one class matrix for training including information on first class information for training to N-th class information for training corresponding to the first cloud point for training to the N-th cloud point for training, is acquired, has instructed the determination neural network 140 to generate a first estimated suitability score for training to an N-th estimated suitability score for training, each of which represents a probability of information on its corresponding cloud point for training being used for updating an HD Map for training, by applying the determination neural network operation to the integrated feature map for training; (3) the learning device 100 has instructed the loss layer 150 to generate a loss by referring to (i) the first estimated suitability score for training to the N-th estimated suitability score for training and (ii) a first Ground Truth (GT) suitability score to an N-th GT suitability score, and perform backpropagation by using the loss, to thereby learn at least part of parameters of the determination neural network 140 and the coordinate neural network 130, a testing device, if at least one coordinate matrix for testing, including information on a first coordinate for testing to an N-th coordinate for testing, corresponding to a first cloud point for testing to an N-th cloud point for testing detected in a target region for testing, is acquired, may instruct the coordinate neural network 130 to generate at least one local feature map for testing and at least one global feature vector for testing by applying at least one coordinate neural network operation to the coordinate matrix for testing.

Thereafter, the testing device, if at least one integrated feature map for testing, which has been generated by integrating (i) the local feature map for testing, (ii) the global feature vector for testing and (iii) at least one class matrix for testing including information on first class information for testing to N-th class information for testing corresponding to the first cloud point for testing to the N-th cloud point for testing, is acquired, may instruct the determination neural network 140 to generate a first estimated suitability score for testing to an N-th estimated suitability score for testing, each of which represents a probability of information on its corresponding cloud point for testing being used for updating an HD Map for testing, by applying the determination neural network operation to the integrated feature map for testing.

Then, the testing device may instruct an updating module to determine whether each of the first estimated suitability score for testing to the N-th estimated suitability score for testing is larger than a threshold or not, and update the HD Map for testing by using specific information on one or more specific cloud points whose corresponding specific estimated suitability scores are larger than the threshold.

Herein, the coordinate matrix for testing and the class matrix for testing may have been acquired by using a scheme similar to that of the learning method. That is, a server for testing, which interworks with one or more data acquisition vehicles for testing, (i) may classify each of pieces of map data for testing, acquired through each of the data acquisition vehicles for testing, by using each of pieces of location information for testing on each of locations where each of pieces of the map data for testing has been acquired, (ii) may generate the coordinate matrix for testing and the class matrix for testing by using specific information for testing in classified map data for testing, on the target region for testing, and (iii) may deliver the coordinate matrix for testing and the class matrix for testing to the testing device. Also, the server for testing may perform (i) a process of generating the coordinate matrix for testing by using specific cloud point information for testing, corresponding to the target region for testing, in the map data for testing and (ii) a process of generating the class matrix for testing by using specific class information for testing, corresponding to the target region for testing, in the map data for testing.

By performing aforementioned processes performed by the testing device, the undesirable information on the temporary objects can be filtered and only necessary information can be used for updating the HD Map for testing.

The present disclosure describes a method of acquiring the information sets from each of the vehicles, and this method may be considered as one of the multi-vehicle depth estimation technology. Also, a method of integrating such information into the HD map may be considered as one of the V2X information fusion technology. A 3D space reconstruction is performed to update the HD map using such technology. As a result, the HD map may be generated using information acquired by multiple vehicles, instead of conventional methods with high cost of production and management of a vehicle equipped with apparatuses capable of producing high definition maps moving on a road, collecting laser-scanned information and images and producing the maps by lane detection and mapping, etc.

The present disclosure has an effect of allowing safe autonomous driving by providing the learning method for updating the HD map by acquiring the multi-vehicle depth estimation information using the V2X information fusion and performing the 3D space reconstruction by using the multi-vehicle depth estimation information.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for selecting specific information, to be used for updating an HD Map, among information acquired through multiple vehicles, comprising steps of:
   (a) a learning device, if at least one coordinate matrix, including information on a first coordinate to an N-th coordinate, corresponding to a first cloud point to an N-th cloud point detected in a target region, is acquired, instructing a coordinate neural network to generate at least one local feature map and at least one global feature vector by applying at least one coordinate neural network operation to the coordinate matrix;
   (b) the learning device, if at least one integrated feature map, which has been generated by integrating (i) the local feature map, (ii) the global feature vector and (iii) at least one class matrix including information on first class information to N-th class information corresponding to the first cloud point to the N-th cloud point, is acquired, instructing a determination neural network to generate a first estimated suitability score to an N-th estimated suitability score, each of which represents a probability of information on its corresponding cloud point being used for updating the HD Map, by applying at least one determination neural network operation to the integrated feature map;

(c) the learning device instructing a loss layer to generate a loss by referring to (i) the first estimated suitability score to the N-th estimated suitability score and (ii) a first Ground Truth(GT) suitability score to an N-th GT suitability score, and perform backpropagation by using the loss, to thereby learn at least part of parameters of the determination neural network and the coordinate neural network.

2. The method of claim 1, wherein, at the step of (a), the learning device instructs each of one or more coordinate convolutional neurons in at least one coordinate convolutional layer of the coordinate neural network to apply at least one coordinate convolutional neuron operation to its inputted value by using its own parameter, and to deliver its outputted value to its next coordinate convolutional neuron, to thereby apply at least one coordinate convolutional operation, which is at least part of the coordinate neural network operation, to the coordinate matrix, and then to thereby generate the local feature map.

3. The method of claim 2, wherein, at the step of (a), the learning device instructs a global feature layer in the coordinate neural network to apply at least one global feature operation, which is at least part of the coordinate neural network operation, to the local feature map, to thereby generate the global feature vector.

4. The method of claim 1, wherein, at the step of (b), the integrated feature map is generated by channel-wise concatenating (i) the class matrix including the first class information to the N-th class information as its components, arranged in a specific order, (ii) the local feature map including each of feature values corresponding to each of the first cloud point to the N-th cloud point, as its components, arranged in the specific order, and (iii) a global feature map generated by duplicating the global feature vector N times.

5. The method of claim 1, wherein, at the step of (b), the learning device (i) instructs each of one or more determination convolutional neurons in at least one determination convolutional layer of the determination neural network to apply at least one determination convolutional neuron operation to its inputted value by using its own parameter, and to deliver its outputted value to its next determination convolutional neuron, to thereby apply at least one determination convolutional operation, which is at least part of the determination neural network operation, to the determination matrix, and then to thereby generate a determination feature map, and (ii) instructs a determination output layer in the determination neural network to perform a classification operation, which is at least part of the determination neural network operation, on the first cloud point to the N-th cloud point by referring to the determination feature map, to thereby generate the first estimated suitability score to the N-th estimated suitability score.

6. The method of claim 1, wherein, at the step of (c), the learning device instructs the loss layer to generate the loss by using a following formula:

$$Loss = -\frac{1}{N}\sum_{i=1}^{N} y_i \log(\hat{y}_i)$$

wherein N denotes the number of the first cloud point to the N-th cloud point, $y_i$ denotes an i-th estimated suitability score, and $\hat{y}_i$ denotes an i-th GT suitability score.

7. The method of claim 1, wherein, at the step of (c), the learning device instructs the loss layer to perform the backpropagation by using a gradient-descent scheme, to thereby allow a subsequent first estimated suitability score to a subsequent N-th estimated suitability score, to be generated by using the parameters adjusted by the backpropagation, to become relatively more similar to a subsequent first GT suitability score to a subsequent N-th GT suitability score corresponding thereto.

8. The method of claim 1, wherein a server, which interworks with one or more data acquisition vehicles, (i) classifies each of pieces of map data, acquired through each of the data acquisition vehicles, by using each of pieces of location information on each of locations where each of pieces of the map data has been acquired, (ii) generates the coordinate matrix and the class matrix by using target information on the target region in the classified map data, and (iii) delivers the coordinate matrix and the class matrix to the learning device.

9. The method of claim 8, wherein the server, if a first specific piece of the map data and a second specific piece of the map data both correspond to a same specific region, integrates the first and the second specific pieces by applying at least one integration operation to the first and the second specific pieces.

10. The method of claim 8, wherein each of the data acquisition vehicles uses (i) at least part of at least one camera and at least one depth sensor and (ii) an operation module, corresponding to said at least part of the camera and the depth sensor, to acquire cloud point information and class information on one or more objects located closer than a threshold from itself, to thereby acquire at least part of the map data and deliver said at least part of the map data to the server.

11. The method of claim 10, wherein the server performs (i) a process of generating the coordinate matrix by using specific cloud point information, corresponding to the target region, in the map data and (ii) a process of generating the class matrix by using specific class information, corresponding to the target region, in the map data.

12. A testing method for selecting specific information, to be used for updating an HD Map, among information acquired through multiple vehicles, comprising steps of:

(a) on condition that (1) a learning device, if at least one coordinate matrix for training, including information on a first coordinate for training to an N-th coordinate for training, corresponding to a first cloud point for training to an N-th cloud point for training detected in a target region for training, is acquired, has instructed a coordinate neural network to generate at least one local feature map for training and at least one global feature vector for training by applying at least one coordinate neural network operation to the coordinate matrix for training; (2) the learning device, if at least one integrated feature map for training, which has been generated by integrating (i) the local feature map for training, (ii) the global feature vector for training and (iii) at least one class matrix for training including information on first class information for training to N-th class information for training corresponding to the first cloud point for training to the N-th cloud point for training, is acquired, has instructed a determination neural network to generate a first estimated suitability score for training to an N-th estimated suitability score for training, each of which represents a probability of information on its corresponding cloud point for training being used for updating an HD Map for training, by applying at least one determination neural network operation to the integrated feature map for training; (3) the learning device has instructed a loss layer to generate a loss by referring to (i) the first estimated suitability score for training to the N-th estimated suitability score for training and (ii) a first Ground Truth(GT) suitability score to an N-th GT suitability score, and perform backpropagation by using the loss, to thereby learn at least part of parameters of the determination neural network and the coordinate neural network, a testing device, if at least one coordinate matrix for testing, including information on a first coordinate for testing to an N-th coordinate for testing, corresponding to a first cloud point for testing to an N-th cloud point for testing detected in a target region for testing, is acquired, instructing the coordinate neural network to generate at least one local feature map for testing and at least one global feature vector for testing by applying the coordinate neural network operation to the coordinate matrix for testing;

(b) the testing device, if at least one integrated feature map for testing, which has been generated by integrating (i) the local feature map for testing, (ii) the global feature vector for testing and (iii) at least one class matrix for testing including information on first class information for testing to N-th class information for testing corresponding to the first cloud point for testing to the N-th cloud point for testing, is acquired, instructing the determination neural network to generate a first estimated suitability score for testing to an N-th estimated suitability score for testing, each of which represents a probability of information on its corresponding cloud point for testing being used for updating an HD Map for testing, by applying the determination neural network operation to the integrated feature map for testing.

13. The method of claim 12, further comprising a step of:

(c) the testing device instructing an updating module to determine whether each of the first estimated suitability score for testing to the N-th estimated suitability score for testing is larger than a threshold or not, and update the HD Map for testing by using specific information on one or more specific cloud points whose corresponding specific estimated suitability scores are larger than the threshold.

14. The method of claim 12, wherein a server for testing, which interworks with one or more data acquisition vehicles for testing, (i) classifies each of pieces of map data for testing, acquired through each of the data acquisition vehicles for testing, by using each of pieces of location information for testing on each of locations where each of pieces of the map data for testing has been acquired, (ii) generates the coordinate matrix for testing and the class matrix for testing by using target information for testing on the target region for testing in the classified map data for testing and (iii) delivers the coordinate matrix for testing and the class matrix for testing to the testing device.

15. The method of claim 12, wherein the server for testing performs (i) a process of generating the coordinate matrix for testing by using specific cloud point information for testing, corresponding to the target region for testing, in the map data for testing and (ii) a process of generating the class matrix for testing by using specific class information for testing, corresponding to the target region for testing, in the map data for testing.

16. A learning device for selecting specific information, to be used for updating an HD Map, among information acquired through multiple vehicles, comprising:
at least one memory that stores instructions; and
at least one processor configured to execute the instructions to perform processes of: (I) if at least one coordinate matrix, including information on a first coordinate to an N-th coordinate, corresponding to a first cloud point to an N-th cloud point detected in a target region, is acquired, instructing a coordinate neural network to generate at least one local feature map and at least one global feature vector by applying at least one coordinate neural network operation to the coordinate matrix; (II) if at least one integrated feature map, which has been generated by integrating (i) the local feature map, (ii) the global feature vector and (iii) at least one class matrix including information on first class information to N-th class information corresponding to the first cloud point to the N-th cloud point, is acquired, instructing a determination neural network to generate a first estimated suitability score to an N-th estimated suitability score, each of which represents a probability of information on its corresponding cloud point being used for updating the HD Map, by applying at least one determination neural network operation to the integrated feature map; (III) instructing a loss layer to generate a loss by referring to (i) the first estimated suitability score to the N-th estimated suitability score and (ii) a first Ground Truth(GT) suitability score to an N-th GT suitability score, and perform backpropagation by using the loss, to thereby learn at least part of parameters of the determination neural network and the coordinate neural network.

17. The device of claim 16, wherein, at the process of (I), the processor instructs each of one or more coordinate convolutional neurons in at least one coordinate convolutional layer of the coordinate neural network to apply at least one coordinate convolutional neuron operation to its inputted value by using its own parameter, and to deliver its outputted value to its next coordinate convolutional neuron, to thereby apply at least one coordinate convolutional operation, which is at least part of the coordinate neural network operation, to the coordinate matrix, and then to thereby generate the local feature map.

18. The device of claim 17, wherein, at the process of (I), the processor instructs a global feature layer in the coordinate neural network to apply at least one global feature operation, which is at least part of the coordinate neural network operation, to the local feature map, to thereby generate the global feature vector.

19. The device of claim 16, wherein, at the process of (II), the integrated feature map is generated by channel-wise concatenating (i) the class matrix including the first class information to the N-th class information as its components, arranged in a specific order, (ii) the local feature map including each of feature values corresponding to each of the first cloud point to the N-th cloud point, as its components, arranged in the specific order, and (iii) a global feature map generated by duplicating the global feature vector N times.

20. The device of claim 16, wherein, at the process of (II), the processor (i) instructs each of one or more determination convolutional neurons in at least one determination convolutional layer of the determination neural network to apply at least one determination convolutional neuron operation to its inputted value by using its own parameter, and to deliver its outputted value to its next determination convolutional neuron, to thereby apply at least one determination convolutional operation, which is at least part of the determination neural network operation, to the determination matrix, and then to thereby generate a determination feature map, and (ii) instructs a determination output layer in the determination neural network to perform a classification operation, which is at least part of the determination neural network operation, on the first cloud point to the N-th cloud point by referring to the determination feature map, to thereby generate the first estimated suitability score to the N-th estimated suitability score.

21. The device of claim 16, wherein, at the process of (III), the processor instructs the loss layer to generate the loss by using a following formula:

$$\text{Loss} = -\frac{1}{N}\sum_{i=1}^{N} y_i \log(\hat{y}_i)$$

wherein N denotes the number of the first cloud point to the N-th cloud point, $y_i$ denotes an i-th estimated suitability score, and $\hat{y}_i$ denotes an i-th GT suitability score.

22. The device of claim 16, wherein, at the process of (III), the processor instructs the loss layer to perform the backpropagation by using a gradient-descent scheme, to thereby allow a subsequent first estimated suitability score to a subsequent N-th estimated suitability score, to be generated by using the parameters adjusted by the backpropagation, to become relatively more similar to a subsequent first GT suitability score to a subsequent N-th GT suitability score corresponding thereto.

23. The device of claim 16, wherein a server, which interworks with one or more data acquisition vehicles, (i) classifies each of pieces of map data, acquired through each of the data acquisition vehicles, by using each of pieces of location information on each of locations where each of pieces of the map data has been acquired, (ii) generates the coordinate matrix and the class matrix by using target information on the target region in the classified map data, and (iii) delivers the coordinate matrix and the class matrix to the learning device.

24. The device of claim 23, wherein the server, if a first specific piece of the map data and a second specific piece of the map data both correspond to a same specific region, integrates the first and the second specific pieces by applying at least one integration operation to the first and the second specific pieces.

25. The device of claim 23, wherein each of the data acquisition vehicles uses (i) at least part of at least one camera and at least one depth sensor and (ii) an operation module, corresponding to said at least part of the camera and the depth sensor, to acquire cloud point information and class information on one or more objects located closer than a threshold from itself, to thereby acquire at least part of the map data and deliver said at least part of the map data to the server.

26. The device of claim 25, wherein the server performs (i) a process of generating the coordinate matrix by using specific cloud point information, corresponding to the target region, in the map data and (ii) a process of generating the class matrix by using specific class information, corresponding to the target region, in the map data.

27. A testing device for selecting specific information, to be used for updating an HD Map, among information acquired through multiple vehicles, comprising:
at least one memory that stores instructions; and
at least one processor configured to execute the instructions to perform processes of: (I) on condition that (1) a learning device, if at least one coordinate matrix for training, including information on a first coordinate for training to an N-th coordinate for training, corresponding to a first cloud point for training to an N-th cloud point for training detected in a target region for training, is acquired, has instructed a coordinate neural network to generate at least one local feature map for training and at least one global feature vector for training by applying at least one coordinate neural network operation to the coordinate matrix for training; (2) the learning device, if at least one integrated feature map for training, which has been generated by integrating (i) the local feature map for training, (ii) the global feature vector for training and (iii) at least one class matrix for training including information on first class information for training to N-th class information for training corresponding to the first cloud point for training to the N-th cloud point for training, is acquired, has instructed a determination neural network to generate a first estimated suitability score for training to an N-th estimated suitability score for training, each of which represents a probability of information on its corresponding cloud point for training being used for updating an HD Map for training, by applying at least one determination neural network operation to the integrated feature map for training; (3) the learning device has instructed a loss layer to generate a loss by referring to (i) the first estimated suitability score for training to the N-th estimated suitability score for training and (ii) a first Ground Truth(GT) suitability score to an N-th GT suitability score, and perform backpropagation by using the loss, to thereby learn at least part of parameters of the determination neural network and the coordinate neural network, if at least one coordinate matrix for testing, including information on a first coordinate for testing to an N-th coordinate for testing, corresponding to a first cloud point for testing to an N-th cloud point for testing detected in a target region for testing, is acquired, instructing the coordinate neural network to generate at least one local feature map for testing and at least one global feature vector for testing by applying the coordinate neural network operation to the coordinate matrix for testing; (II) if at least one integrated feature map for testing, which has been generated by integrating (i) the local feature map for testing, (ii) the global feature vector for testing and (iii) at least one class matrix for testing including information on first class information for testing to N-th class information for testing corresponding to the first cloud point for testing to the N-th cloud point for testing, is acquired, instructing the determination neural network to generate a first estimated suitability score for testing to an N-th estimated suitability score for testing, each of which represents a probability of information on its corresponding cloud point for testing being used for updating an HD Map for testing, by applying the determination neural network operation to the integrated feature map for testing.

28. The device of claim 27, wherein the processor further performs a process of:

(III) instructing an updating module to determine whether each of the first estimated suitability score for testing to the N-th estimated suitability score for testing is larger than a threshold or not, and update the HD Map for testing by using specific information on one or more specific cloud points whose corresponding specific estimated suitability scores are larger than the threshold.

29. The device of claim 27, wherein a server for testing, which interworks with one or more data acquisition vehicles for testing, (i) classifies each of pieces of map data for testing, acquired through each of the data acquisition vehicles for testing, by using each of pieces of location information for testing on each of locations where each of pieces of the map data for testing has been acquired, (ii) generates the coordinate matrix for testing and the class matrix for testing by using target information for testing on the target region for testing in the classified map data for testing, and (iii) delivers the coordinate matrix for testing and the class matrix for testing to the testing device.

30. The device of claim 27, wherein the server for testing performs (i) a process of generating the coordinate matrix for testing by using specific cloud point information for testing, corresponding to the target region for testing, in the map data for testing and (ii) a process of generating the class matrix for testing by using specific class information for testing, corresponding to the target region for testing, in the map data for testing.

* * * * *